United States Patent [19]

Rydborn

[11] 4,072,935
[45] Feb. 7, 1978

[54] APPARATUS FOR INDICATING WHETHER ONE OR MORE OBJECTS ARE IN MOTION

[76] Inventor: Sten-Åke Olaus Rydborn, Kloxhultsvagen 21, 343 00 Almhult, Sweden

[21] Appl. No.: 683,146

[22] Filed: May 4, 1976

[30] Foreign Application Priority Data

May 5, 1975 Sweden .................................. 7505161

[51] Int. Cl.$^2$ .............................................. G08B 21/00
[52] U.S. Cl. ......................................... 340/259; 57/81; 66/163; 139/370.1
[58] Field of Search .......................... 340/259; 66/163; 139/370.1, 370.2; 28/51; 57/81

[56] References Cited

U.S. PATENT DOCUMENTS

| | | | |
|---|---|---|---|
| 2,711,093 | 6/1955 | Edelman et al. | 66/163 |
| 3,688,958 | 9/1972 | Rydborn | 66/163 |
| 3,911,969 | 10/1975 | Rydborn | 340/259 |

Primary Examiner—Glen R. Swann, III
Attorney, Agent, or Firm—Beveridge, De Grandi, Kline & Lunsford

[57] ABSTRACT

A plurality of signal generators are provided, one signal generator being associated with each object for example threads, strips, or the like whose motion is to be detected. Each signal generator generates an electric signal upon detection of movement of its associated object. The signal generators are connected in a series circuit, each end of which is connected to the input of a separate signal amplifier. The connections between adjacent signal generators in the series circuit are successively grounded. The signal amplifiers have their outputs connected to a gate circuit, the output of which is connected to the device for successively grounding the signal circuit connections so that, if a signal is generated simultaneously by at least one signal generator on each side of the grounded connection, operation is interrupted.

6 Claims, 2 Drawing Figures

APPARATUS FOR INDICATING WHETHER ONE OR MORE OBJECTS ARE IN MOTION

BACKGROUND OF THE INVENTION

The present invention relates to an apparatus for indicating whether one or more objects, for example, threads, strips or the like, are in motion, the apparatus including means, for each object, generating an electric signal corresponding to the movement of the object.

Known apparatuses for the surveillance of threads, strips or the like have, in recent years, become more and more complicated and have thereby become involved with difficulties dependent on the complexity of the apparatuses. Because of the fact that the constructions are complicated, their cost will also be higher and the risk for the occurrence of faults will be greater. This tendency has become more and more pronounced, since there has been placed the requirement that the apparatus, apart from maintaining a surveillance of the movement of an object, shall also indicate whether two or more objects are in motion at the same time.

SUMMARY OF THE INVENTION

The object of the present invention is to provide an apparatus of the type indicated by way of introduction and to give this apparatus a simple construction so that it occasions low manufacturing costs and has a reliable function. According to the invention, the signal-generating means are series-connected to each other; a first signal amplifier is coupled to one end of the series circuit; a second signal amplifier is coupled to the other end of the series circuit; a coupling device is arranged to successively earth the connections between the signal-generating means; the outputs of the two amplifiers are each coupled to an input to a gate means whose output is coupled to the coupling device for stopping thereof on the occurrence of a signal at both inputs which indicates a signal from at least one signal-generating means on either side of the earthed connection.

BRIEF DESCRIPTION OF THE DRAWINGS

The invention will be described in greater detail hereinbelow with reference to the accompanying drawings; on which

DESCRIPTION OF A PREFERRED EMBODIMENT

Figure 1:
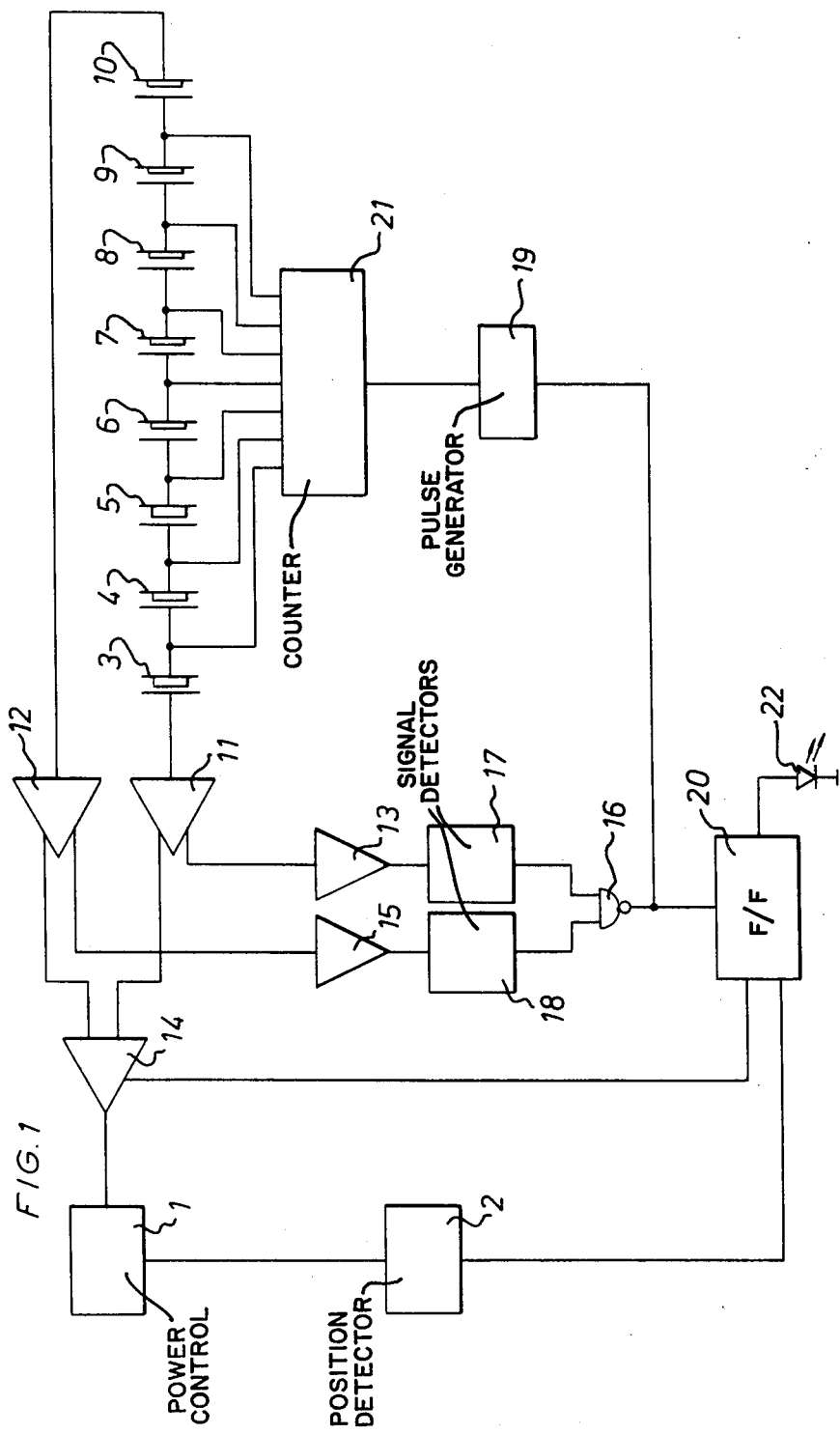
FIG. 1 is a block diagram of an embodiment of an apparatus according to the invention.

The apparatus according to the present invention shown in FIG. 1 is intended for the surveillance of a weft which consists of a thread in shuttle-free looms. In this case, the apparatus in FIG. 1 is intended to give a signal to a knock-off device 1 which can be, for example, a relay and which is arranged to stop the power means of the loom if the signal thereto disappears for an interval which is determined by means of a light-limit device, or light source-photoelectric cell detector device, 2. This interval can be determined by the length of a flag which breaks a light beam. The apparatus according to the present invention is, naturally, not restricted to this field of use but may be used in other contexts where it is desirable to maintain a surveillance of the motion of an object and simultaneously establish if only one of a possible number of objects is in motion.

In the present case, the apparatus according to the present invention comprises eight signal-generating means 3, 4, 5, 6, 7, 8, 9 and 10. Each one of these means is arranged to give off an electric signal when an object is moved past the means and in the vicinity thereof. These means 3–10 can consist of piezoelectric crystals and the means 3–10 are, as is apparent from FIG. 1, series-connected to each other. One end of the series circuit is coupled to a pre-amplifier 11, whereas the other end of the series circuit is coupled to a pre-amplifier 12. The output from the pre-amplifier 11 is coupled to an amplifier 13 and a mixer circuit 14. The output from the pre-amplifier 12 is coupled to an amplifier 15 and to the mixer circuit 14. The output from the amplifier 13 is coupled to one input of a NAND gate 16 via a signal detector 17, whereas the output from the amplifier 15 is coupled to the other input of the NAND gate 16 via a detector 18. The detectors 17 and 18 are of such a type as to give a logic signal level on the output when a signal occurs on the input. The output from the NAND gate 16 is coupled to a clock pulse generator 19 and to a bistable flip-flop circuit 20. The output from the clock pulse generator 19 is coupled to a coupling device 21 in the form of a counter circuit whose counting stage outputs are coupled each to a connection between the signal-generating means 3–10. The counter circuit 21 is, thus, arranged to successively earth the connections between the signal-generating means 3–10. In order that the counter circuit 21 be able to establish communication between the signal-generating means, it must receive a clock pulse from the clock pulse generator 19. As long as the level on the output from the NAND gate 16 is low, the clock pulse generator 19 will not generate the clock pulse. The signal level on the output from the NAND gate 16 is low as long as there is a high signal level at both of the inputs of the NAND gate 16, which entails that there must occur a signal on the input of both the pre-amplifier 11 and the pre-amplifier 12. This occurs when none of the connections between the signal-generating means 3–10 is earthed or when any of the signal-generating means on each side or when any of the signal-generating means on each side of an earthed connection emits a signal. Simultaneously as the amplifiers 13 and 15 receive signals from the pre-amplifiers 11, 12 respectively, the mixer stage 14 will also receive a signal at its input. The mixer stage 14 will, however, receive a signal on its input if only the pre-amplifier 11 emits a signal or if only the pre-amplifier 12 emits a signal.

The bistable flip-flop circuit 20 is coupled partly to a light emitting diode 22 and partly to the mixer circuit 14 and to a light-limit position device 2. The bistable flip-flop circuit 20 is constructed such that it can be switched to its one state only when it receives a signal from the light-limit position device. This signal from the light-limit position device 2 occurs only during the desired surveillance interval. During the desired surveillance interval, the bistable flip-flop circuit is thus switchable to its one state when a low signal level occurs on the output from the NAND gate 16. If this low signal level occurs, the bistable flip-flop circuit 20 will be switched to its abovementioned one state in which the light emitting diode 22 is lit and the mixer circuit 14 is activated in such a manner that no signal occurs on its output, whereby the knock-off device will stop the power means of the loom, as an indication of the fact that the weft was not correct.

In the following passages, a detailed description is given illustrating the operational method during a weft.

As soon as the loom is started, the knock-off device 1 will enter into operation and as soon as this occurs, the apparatus according to the invention will be impressed with a suitable supply voltage which entails in turn that the clock pulse generator 19 will generate clock pulses which cause the counter 21 to successively earth the connections between the signal-generating means 3–10. If, for example, the weft is to consist of one thread which runs past the signal-generating means 5, the pre-amplifier 11 will receive a signal from the signal-generating means 5 when the counter circuit 21 earths the connections between the signal-generating means 5, 6, 7, 8, 9 and 10, whereas the pre-amplifier 12 receives the signal from the signal-generating means 5 when the counter circuit 21 earths the connections between the signal-generating means 3, 4 and 5. As long as the counter circuit 21 is in function, the mixer circuit 14 will receive a signal on its input, on condition that the thread remains whole and causes the signal-generating means 5 to emit an electric signal. If the surveillance or sensing interval determined by means of the light-limit positon device 2 ccurs during that period when the mixer circuit 14 receives an input signal and simultaneously emits an output signal to the knock-off device 1, this will not stop the power means of the loom. If, on the other hand, the signal to the mixer circuit 14 ceases, and thereby its output signal, the knock-off device 1 will stop the power means of the loom.

If only one of the signal-generating means on one side of an earthed connection of the signal-generating means emits a signal, the output from the NAND gate 16 will not be switched from high level to low level, which is an indication that only a single thread is included in the weft. If, on the other hand, a signal is received from one or more signal-generating means on either side of the earthed connection, the output from the NAND gate 16 will be switched to low level, which entails that the bistable flip-flop circuit 20 will be switched to its above-mentioned one state which, in turn, entails that the output signal from the mixer circuit 14 ceases. This entails, in its turn, that the knock-off device 1 will stop the loom and the operator of the loom can quickly locate the fault in that the light emitting diode 22 is lit. The function will, in principle, be the same if a signal from two of the signal-generating means occurs already at the beginning of the surveillance interval, since the clock pulse generator 19 will stop as soon as the output from the NAND gate 16 becomes low.

In the present apparatus, the bistable flip-flop circuit 20 is arranged such that after receiving a signal from the light-limit position device 2 that a surveillance or sensing interval has been commenced, it can be switched to its above-mentioned one state only for 10 milliseconds, since this period is considered to be sufficient for establishing whether the weft consists of a single thread or several threads. This period of 10 milliseconds is, naturally, not critical but can be selected from case to case.

Figure 2:
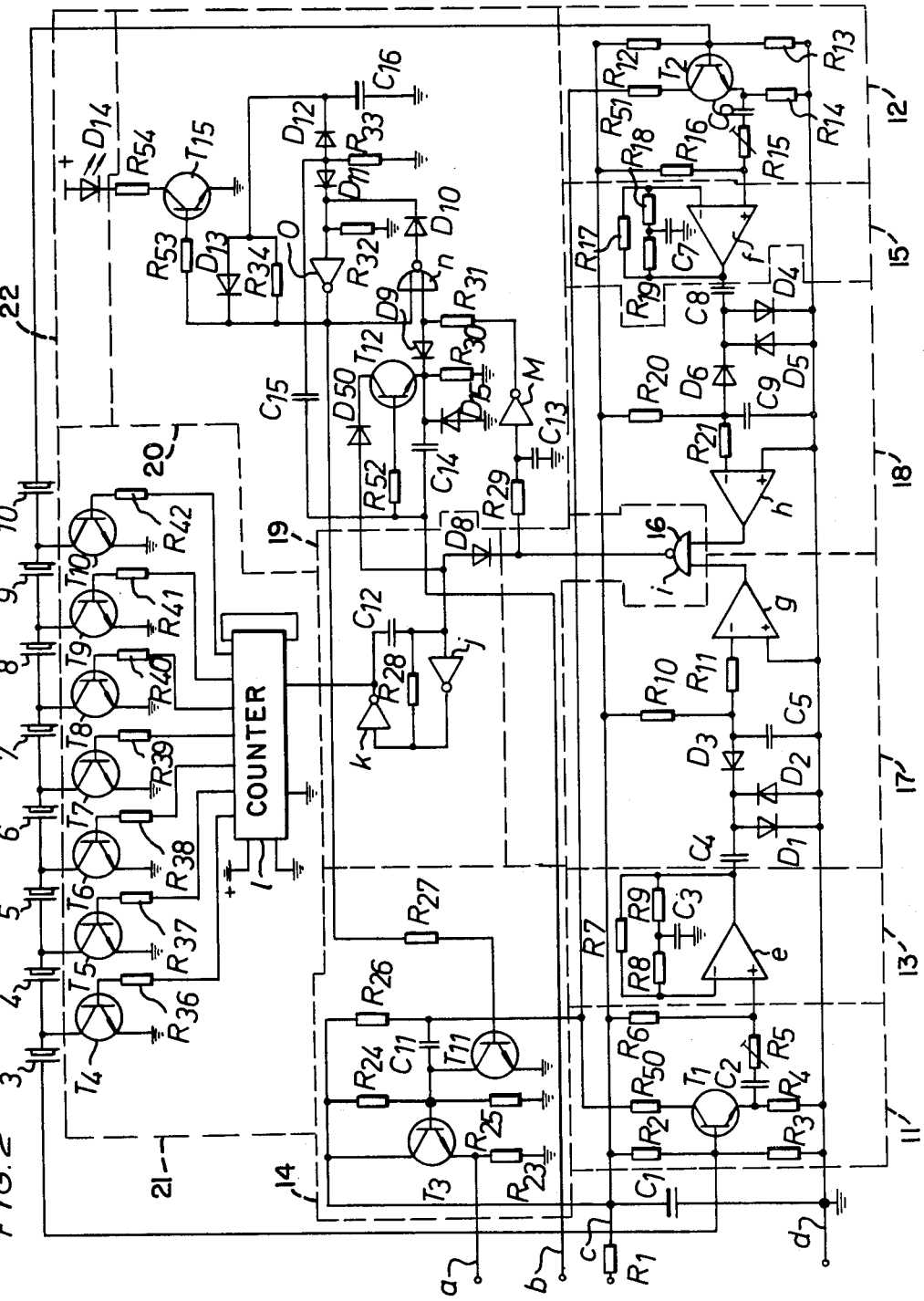
FIG. 2 shows a detailed coupling diagram of a practical embodiment of the invention.

In the following passages, a practical embodiment of the apparatus described above will be described in greater detail with reference to FIG. 2. The circuit shown in FIG. 2 is coupled to the input of the knock-off device 1 via the connection a and to the light-limit position device 2 via the connection b. The connections c and d are coupled to a suitable power assembly which on one input coupled to the connection c via a resistor R 1 is preferably to give 13 V and on the connection d preferably 0 V.

The signal-generating means 3–10 are series-coupled to each other and one end of the series circuit is coupled to the base of a transistor T 1 which, in the present case, can be considered as the pre-amplifier 11, whereas the other end of the series circuit is coupled to the base of a transistor T 2 which, in the present case, can be considered as the pre-amplifier 12. Furthermore, the base of the transistor T 1 is coupled to the connection c via a resistor R 2 and a resistor R 1 coupled in series therewith, and to the connection d via a resistor R 3. A condenser C 1 is coupled between the connection between the resistor R 1 and the resistor R 2 and the connection d. The emitter of the transistor T 1 is coupled to the connection d via a resistor R 4 and to the plus input to an operational amplifier e via a series circuit of a condenser C 2 and a variable resistor R 5. The collector of the transistor T 1 is coupled to the collector of the transistor T 2 via two mutually series-coupled resistors R 50 and R 51. Furthermore, the base of the transistor T 2 is coupled to the connection c via a resistor R 12 and to the connection d via a resistor R 13. The emitter of the transistor T 2 is coupled to the connection d via a resistor R 14 and to the plus input of an operational amplifier f via a series circuit of a condenser C 6 and a variable resistor R 15. The plus input of the operational amplifier e is coupled to the connection c via a resistor R 6, whereas the plus input of the operational amplifier f is coupled to the connection c via a resistor R 16. The output from the operational amplifier e is coupled to the minus input of a further operational amplifier g via a series circuit of a condenser C 4, a diode D 3 and a resistor R 11, it being here observed that the diode D 3 is turned with its cathode towards the output of the operational amplifier e and the anode towards the minus input of the operational amplifier g. Furthermore, the output of the operational amplifier e is coupled to the minus input of the operational amplifier e via a resistor network which consists of two series-connected resistors R 8 and R 9 and a resistor R 7 parallel-connected to the series-connected resistors, the connection between the resistors R 8 and R 9 being earthed via a condenser C 3. The connection between the condenser C 4 and the cathode of the diode D 3 is coupled to the connection d via two parallel-coupled diodes D 1 and D 2, the diode D 1 being turned with its cathode towards the connection and the diode D 2 being turned with the anode towards the connection d. The connection between the anode of the diode D 3 and the resistor R 11 is coupled to the connection c via a resistor R 10 and to the connection d via a condenser C 5. The plus input of the operational amplifier g is coupled to the connection d. The output from the operational amplifier f is coupled to the minus input of an operational amplifier h via a series circuit of a condenser C 8, a diode D 6 and a resistor R 21, the diode D 6 being turned with its cathode towards the output of the operational amplifier f and its anode towards the minus input of the operational amplifier h. The output of the operational amplifier f is further coupled to its minus input via a resistor network which consists of two series-coupled resistors R 18 and R 19 and the resistor R 17 parallel-coupled therewith, the connection between the resistors R 18 and R 19 being earthed via a condenser C 7. The connection between the condenser C 8 and the cathode of the diode D 6 is further coupled to the connection d via two mutually parallel-coupled diodes D 4 and D 5, the diode D 4 being turned with its cathode towards the connection d and the diode D 5 being turned with its anode towards the connection d. The connection between the cathode of the diode D 6 and the resistor R 21 is coupled to the connection c via a resistor R 20 and to the connection d via a condenser C 9. The output from the operational amplifier g is coupled to one input of a NAND gate i and the output from the operational amplifier h is coupled to the other input of the NAND gate. The output from the NAND gate is coupled to the cathode of a diode D 8 whose anode is coupled to the input of an inverter circuit j, whose output is coupled to the input of a further inverter circuit k. The output of the inverter circuit k is coupled to the input of the inverter circuit j via a condenser C 12 and to the clock pulse input of a counter circuit 1. The connection between the condenser C 12 and the input of the inverter circuit j is coupled to the connection between the output of the inverter circuit j and the input of the inverter circuit k via a resistor R 28. The inverter circuits j and k and the resistor R 28 and the condenser C 12 form the clock pulse generator 19. The anode of the diode D 8 is further coupled via the anode of yet another diode D 50 whose cathode is coupled to the collector of a transistor T 12. The base of the transistor T 12 is coupled to the connection b via a resistor R 52 and the emitter to the connection between a condenser C 14 and the cathode of a diode D 9. The other connection to the condenser C14 is coupld to the connection b. The connection between the condenser C 14 and the cathode of a diode D 9 is further coupled to earth via a resistor R 30 and a diode D 15 whose anode is coupled to earth and cathode to the connection.

The cahode of the diode D 8 is further coupled to the input of an inverter circuit m via a resistor R 29, the input being earthed via a condenser C 13 and the output is coupled to the anode of the diode D 9 via a resistor R 31. Resistor R 29 and condensor C 13 make up a delay circuit which prevents stopping of the machine during the passing of objects. The anode of the diode D 9 is further coupled to one input to a NOR gate n whose other input is coupled to the output from an inverter circuit o. The output from the NOR gate n is coupled to the anode of a diode D 10 whose cathode is coupled to the cathode of a diode D 11 and to the input of the inverter circuit o which, moreover, is earthed via a resistor R 32. The anode of the diode D 11 is coupled to earth via a resistor R 33 and to the connection b via a condenser C 15 and to the anode of a diode D 12 whose cathode is coupled to earth via a condenser C 16 and to a parallel circuit consisting of a resistor R 34 and a diode D 13, the other end of the circuit being coupled to the output from the inverter circuit o. The output from the inverter circuit o is further coupled to the base of a transistor T 15 via a resistor R 53, the emitter of the transistor T 15 being earthed and the collector being coupled to the cathode of a light diode D 14 via a resistor R 54, the anode of the diode D 14 being coupled to the above-mentioned 13 V input. Furthermore, the output from the inverter circuit o is coupled to the base of a transistor T 11 via a resistor R 27, the emitter of the transistor T 11 being earthed and the collector coupled to the base of the transistor T 3, whose collector is coupled to the plus connection c and the emitter is earthed via a resistor R 23 and coupled to the connection a. Moreover, the base of the transistor T 3 is coupled to the plus connection c via a resistor R 24 and to earth via a resistor R 25 and to the connection between the resistors R 50 and R 51 via a condenser C 11. The connection between the condenser C 11 and the connection between the resistors R 50 and R 51 is coupled to the plus connection c via a resistor R 26.

The connections between the signal-generating means 3–10 are coupled each to their output from a counter circuit 1, the connection between the signal-generating means 3 and 4 being coupled to the collector of a transistor T 4 whose emitter is earthed and whose base is coupled to the first output from the counter circuit 1 via a resistor R 36. The connection between the signal-generating means 4 and 5 is coupled to the collector of a transistor T 5, the emitter being earthed and the base coupled to the second output from the counter circuit 1 via a resistor R 37. The connection between the signal-generating means 5 and 6 is coupled to the collector of a transistor T 6, the emitter being earthed and the base coupled to the third output from the counter circuit f via a resistor R 38. The connection between the signal-generating means 6 and 7 is coupled to the collector of a transistor T 7, the emitter being earthed and the base coupled to the fourth output from the counter circuit 1 via a resistor R 39. The connection between the signal-generating means 7 and 8 is coupled to the collector of a transistor T 8, the emitter of the transistor being earthed and the base being coupled to the fifth output from the counter circuit 1 via a resistor R 40. The connection between the signal-generating means 8 and 9 is coupled to the collector of a transistor T 9, the emitter being earthed and the base being coupled to the sixth output from the counter circuit 1 via a resistor R 41. The connection between the signal-generating means 9 and 10 is coupled to the collector of a transistor T 10, the emitter being earthed and the base being coupled to the seventh output from the counter circuit 1 via a resistor R 42. The last output from the counter circuit 1 is coupled to the reset input of the counter circuit, so that the counter circuit returns automatically to the first output.

One of the major advantages with the present invention resides in the fact that it can be built up by means of integrated circuits of the so-called mos-type. Thus, the operation amplifiers e, f, g and h are included in a IC-circuit IC 1, wheras the NAND gate i, the inverter circuits j, k, m, o and the NOR circuit n are included in one and the same IC-circuit IC 2. Furthermore, the counter circuit 1 consists of an IC-circuit IC 3.

For exemplification of this practical embodiment, the following list gives the suitable values of the components which are to be included in such a circuit. It should in this instance be observed that the present invention is, naturally, not in any way restricted to the values of these components.

| | |
|---|---|
| R 1 | 100 |
| R 2, R 10, R 12, R 20, R 24, R 29 | 470 k |
| R 3, R 13, R 25 | 220 k |
| R 4, R 14, R 23, R 27, R 36-R 42 | 10 k |
| R 5, R 15 | 500 ohm trimp. |
| R 6, R 16 | 120 k |
| R 7, R 17, R 31 | 1 M |
| R 8, R 9, R 18, R 19 | 47 k |
| R 11, R 21, R 30 | 100 k |
| R 26 | 220 |
| R 28, R 32, R 33, R 52 | 3.3 M |
| R 34 | 10 M |
| R 50, R 51, R 53 | 22 k |
| R 54 | 1 k |
| C 1 | 10 u |
| C 2, C 5, C 6, C 9, C 14 | 0.1 u |
| C 3, C 7, C 11, C 15 | 2200 p |
| C 4, C 8, C 12 | 1000 p |
| C 13 | 0.022 u |

| -continued | |
|---|---|
| C 16 | 0.22 u |
| T 1, T 2, T 3, T 11 | BC 239 C |
| T 4-T 10, T 12, T 15 | BC 238 B |
| D 1- D 13, D 15, D 50 | IN 4148 |
| D 14 | LSL-6L |
| IC 1 | MC 3301 P |
| IC 2 | MC 14572 |
| IC 3 | MC 14017 |

The present invention should not be considered as restricted to that described above and shown in the drawings, many modifications being possible within the spirit and scope of the appended claims.

I claim:

1. Apparatus for indicating whether one or more objects, for example, threads, strips or the like, are in motion, said apparatus including a plurality of signal generating means, one signal generating means associated with each object to be detected, each signal generating means generating an electric signal upon detection of movement of its associated object; means connecting said plurality of signal generating means together in a series circuit; a first signal amplifier coupled to the first end of said series circuit; a second signal amplifier coupled to the second end of said series circuit; a coupling device connected to said connecting means to successively ground the connections between the signal generating means in said series circuit; first gate means having a first input connected to the output of said first signal amplifier, a second input connected to the output of said second signal amplifier, and an output connected to said coupling device, said first gate means interrupting the successive grounding of the connections between the signal generating means upon simultaneous receipt of a signal at both inputs of said first gate means, which indicates a signal from at least one signal-generating means on each side of the grounded connection.

2. The apparatus of claim 1 wherein said coupling device consists of a clock pulse generator and a counter circuit, each of the outputs of said counter circuit being coupled to a unique one of the connections in said series circuit, the clock pulse input of said counter circuit being coupled to said clock pulse generator, said clock pulse generator being driven by the output of said first gate means.

3. The apparatus of claim 1 further comprising second gate means and switching means, the outputs of said amplifiers each being further coupled to an input of said second gate means to cause said second gate means to emit a signal irrespective of whether it is the first or the second amplifier or both amplifiers which emit signals, said second gate means output coupled to said switching means, said switching means connected to deactivate said apparatus in the absence of a signal at the output of said second gate means.

4. The apparatus of claim 3, further comprising a bistable flip-flop circuit, having an input coupled to the output from said first gate means and an output coupled to said second gate means, said bistable flip-flop circuit in its one state, preventing said second gate means from emitting a signal on its output, said bistable flip-flop circuit being switched to its one state by said first gate means on the occurrence of a signal on both inputs of said first gate means.

5. The apparatus of claim 4, further comprising means coupled to said bistable flip-flop circuit for providing an interval during which said bistable circuit is switchable to said one state and an interval during which said bistable flip-flop circuit is prevented from switching to said one state.

6. The apparatus of claim 4 further comprising an alarm device coupled to said bistable flip-flop circuit for activating said alarm device on switching of said bistable flip-flop circuit to said one state.

* * * * *